United States Patent

[11] 3,573,564

| [72] | Inventor | Hans Blauert |
| | | Munich, Germany |
| [21] | Appl. No. | 728,600 |
| [22] | Filed | May 13, 1968 |
| [45] | Patented | Apr. 6, 1971 |
| [73] | Assignee | Siemens Aktiengesellschaft |
| | | Munich, Germany |
| [32] | Priority | May 23, 1967 |
| [33] | | Germany |
| [31] | | S109977 |

[54] RELAY TIME CONTROL CIRCUIT
8 Claims, 3 Drawing Figs.

[52] U.S. Cl. .................................................. 317/142,
317/148.5, 307/293, 317/153
[51] Int. Cl. ...................................................... H01h 47/18,
H01h 47/32
[50] Field of Search .......................................... 317/142,
139, 137, 148.5

[56] References Cited
UNITED STATES PATENTS

| 3,160,788 | 12/1964 | Antoszewski et al. ........ | 317/36 |
| 3,117,253 | 1/1964 | Antoszewski et al. ........ | 317/131 |
| 3,123,746 | 3/1964 | Wachowiak .................. | 317/148.5X |
| 3,032,714 | 5/1962 | Comen .......................... | 317/141X |

*Primary Examiner*—Lee T. Hix
*Assistant Examiner*—C. L. Yates
*Attorney*—Birch, Swindler McKie & Beckett ABSTRACT: A relay time control circuit that varies the inherent response and dropout times of the relay and maintains the actual response and dropout times to a defined range. An electronic switch is controlled by an RC time control circuit to initiate relay actuation when predetermined voltage conditions exist within the RC circuit. The electronic switch is decoupled from the time control circuit, and therefore temperature sensitivity of the electronic switch is not affected by the latter.

RELAY TIME CONTROL CIRCUIT

CROSS-REFERENCE TO RELATED APPLICATION

Applicant claims priority from corresponding German patent application Ser. No. S109,977, filed May 23, 1967.

BACKGROUND OF THE INVENTION

1. Field of the Invention

The invention relates to a time control circuit for use with a relay system, which comprises an RC circuit and an associated electronic switch to control relay operation. In particular, the invention has utility in association with telegraphy installations, wherein relay response and dropout times must be maintained within defined limits.

2. Description of the Prior Art

The prior art teaches the use of RC circuits to control the response and dropout times of relays. Normally, the inherent response and/or dropout times of the relay may be increased or decreased, by selective charging and discharging of a capacitor. An associated switching element evaluates the voltage across the capacitor, and the relay is made to respond or dropout when particular predetermined voltages are produced across the capacitor. It is further known in the prior art that voltage divider means may be employed in association with the switching element to compensate for changes in the working voltage of the circuit.

However, prior art time control circuits for relays have certain disadvantages. Particularly, if they employ transistors, the latter are sensitive to temperature variations of components of the time control circuit, and thereby may distort the predetermined actual response and dropout times desired. Further, if the current through the capacitor of the RC circuit is evaluated, rather than the voltage, relatively long periods of time are required for such evaluation to take place, and therefore the capacitance of the capacitor must be relatively high thereby requiring it to be correspondingly large in size.

SUMMARY OF THE INVENTION

These and other defects of prior art time control circuits for use with relays are solved by the present invention. The time control circuit according to this invention comprises two resistors connected in series, which together with a third resistor form a voltage divider circuit, and a capacitor connected to the dividing connection point thereof. The voltage divider is connected through two oppositely poled diodes to the base of an electronic switch comprising a transistor.

The timing control circuit is connected such that the diodes are alternately controlled to the conducting state, and the transistor evaluates the voltage produced across the capacitor. The capacitor charges in response to a particular control signal applied to the input of the timing control circuit over one resistor, and discharges after termination of the control signal through two resistors connected in series. The voltage produced across the capacitor, rather than the current flowing therethrough, is evaluated. The transistor is effectively decoupled in every operating state of the time control circuit by one of the two diodes, and therefore the sensitivity of the transistor to temperature variations is not affected by components of the time control circuit.

Another advantage resulting from the invention is that since no power is taken from the time control circuit to control the transistor that evaluates the voltage produced across the capacitor, the RC circuit of the time control circuit may comprise a relatively high resistance and small capacitance. Thereby a capacitor of correspondingly small size may be employed.

DETAILED DESCRIPTION OF THE INVENTION

Figure 1:
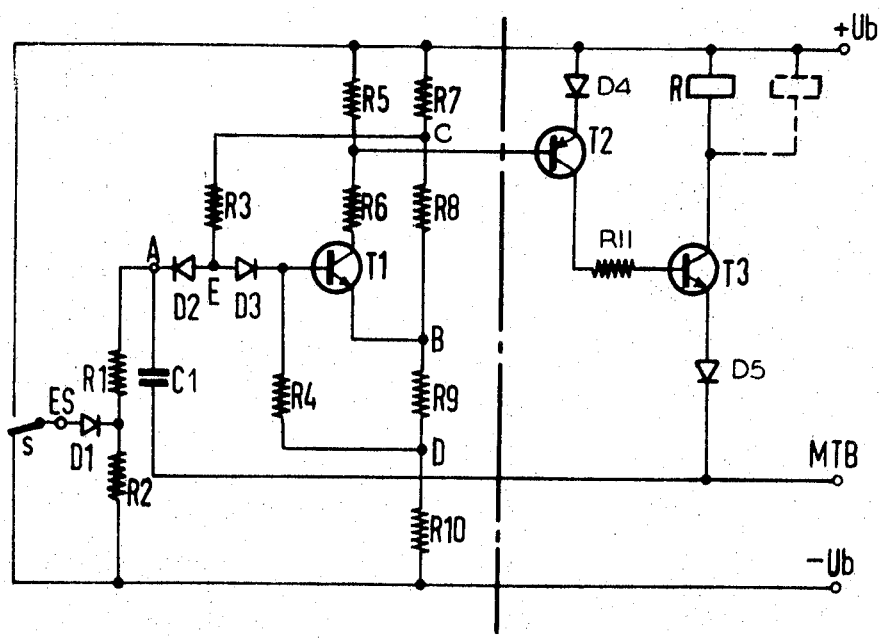
FIG. 1 is an electrical schematic diagram of the circuit according to the invention.

FIG. 1 shows the control circuit utilized according to the invention. This consists of a voltage divider circuit comprising the series connection of resistors R3, R1, and R2 connected between connection point C and the negative supply terminal $(-Ub)$. The described voltage divider produces control potentials at connection point A which depend upon the operating state of the circuit.

The control circuit further comprises capacitor C1 connected between connection point A and reference potential point MTB, which may be considered ground. Transistor T1 comprises an NPN transistor connected in common emitter configuration having its collector connected to the positive supply terminal $+Ub$ through the series connection of resistors R6 and R5. Its emitter is connected to connection point B, which in turn is connected to the positive supply terminal $+Ub$ through the series connection of resistors R7 and R8 and to the negative supply terminal $-Ub$ through the series connection of resistors R9 and R10.

The anodes of oppositely polarized diodes D2 and D3 are connected to common connection point A as is one end of resistor R3. The cathode of diode D2 is connected to one end of resistor R1 and the cathode of diode D3 is connected to the base of transistor T1. The series connection of the cathode of diode D3 and the base of transistor T1 is connected to the series connection of resistors R9 and R10 (connection point D) through resistor R4.

The series connection of resistors R5 and R6 is connected to the base of PNP transistor T2, having its emitter connected to the positive supply terminal $+Ub$ through diode D4 and its collector to the base of transistor T3 through resistor R11.

Transistor T3 comprises an NPN transistor connected in grounded emitter configuration having its collector connected to the positive supply terminal $+Ub$ through relay winding R and its emitter connected to ground through diode D5.

The positive and negative supply terminals are selectively connectable to the control circuit through switch S. Thus, in the position shown, switch S connects the negative supply terminal $-Ub$ to the series connection of resistors R1 and R2 through diode D1. In the alternate position shown by the dotted lines, switch S connects the positive supply terminal $+Ub$ to the described series connection of resistors R1 and R2 through diode D1. Depending upon the relative position of switch S, and the time duration thereof, the control circuit functions to provide the desired operation according to the invention.

Figure 2:
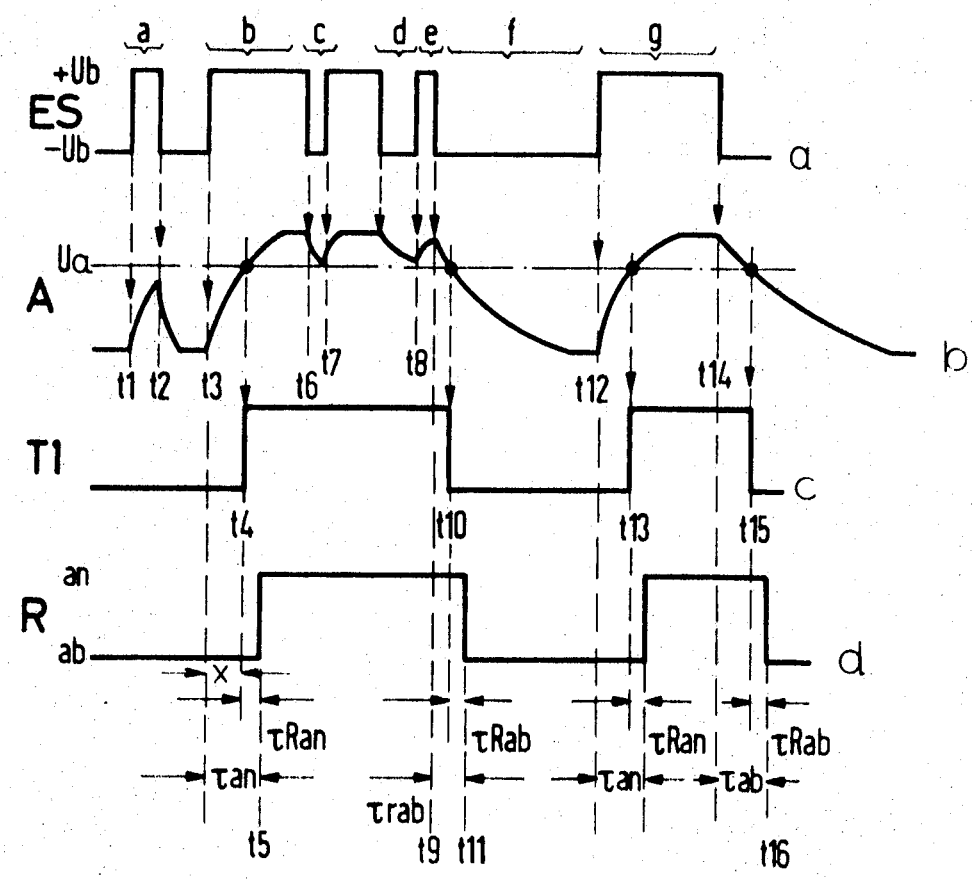
FIG. 2 is a series of five graphs $a$ through $d$ showing the operating conditions for various points of the circuit of FIG. 1, depending upon the particular inputs thereto.

The operation of the circuit shown in FIG. 1 may be explained with relation to FIG. 2. For example, if it is assumed that switch S is in its solid line position, the voltage at the cathode of diode D2 (connection point A) is more negative than the voltage at the anode of diode D2 (connection point E). Therefore, diode D2 is biased to conduction. This condition is obtained by selecting the resistance values of resistors R1, R2, and R3 to provide the voltage desired at connection point A. At the same time, the voltage divider consisting of the series connection of resistors R7, R8, R9, and R10 connected between the positive $+Ub$ and negative $-Ub$ power supply terminals produces a voltage at connection point D that is more positive than the voltage at connection point E. Therefore, diode D3 is biased to the nonconducting condition.

The input ES to the control circuit may be changed by switching switch S to the dotted line position whereby the positive supply terminal $+Ub$ is connected to the control circuit. Capacitor C1 then charges to a predetermined value through the charge circuit comprising diode D1, resistor R1, and capacitor C connected between the positive supply terminal $+Ub$ and ground. The relative values of the charge circuit are selected such that connection point A becomes more positive relative to when switch S was in its solid line position.

This correspondingly causes the voltage at connection point E to become more positive, and diode D3 is biased to the conducting condition when the voltage at connection point E is more positive than the voltage at connection point D. Since the emitter of transistor T1 is connected to connection point B, and since connection point B must be more positive than the voltage existing at connection point D (because of the voltage divider comprising the series connection of resistors R7, R8, R9, and R10) the base of transistor T1 is thus biased more positively than its emitter. This causes transistor T1 to be driven to the conducting state. Correspondingly, the base of transistor T2 is thus biased to a more negative value that is sufficient to drive transistor T2 to conduction, which functions to drive transistor T3 to conduction.

When transistor T3 is driven to conduction, the current flowing in its collector circuit is sufficient to energize the winding of relay R. This causes relay contact r to be actuated. Relay R provides a predetermined response time before its contact r responds to energization of the relay winding. This response time is changed by the described control circuit because the charge time associated with capacitor C1 is determined by resistor R1 connected in series therewith through diode D1. Thus the voltage at connection point D, as determined by the voltage divider consisting of the series connection of resistors R7, R8, R9, and R10, relative to the voltage increase at connection point A due to the charging of capacitor C1, is determinative of the actual response time of relay R.

When control signal +Ub is removed from input ES of the control circuit, capacitor C1 discharges through resistors R1 and R2 connected in series therewith. The potential at the plate of capacitor C1 connected to connection point A thereby decreases and, when it decreases to a value equal to the potential at the emitter of transistor T1 (connection point B), diode D2 is again biased to conduction and diode D3 is again biased to nonconduction.

Controlling transistor T1 to the nonconducting state results in the controlling of transistors T2 and T3 to the nonconducting state. Thereby, the current flow through the winding of relay R is cut off and the winding becomes deenergized, whereby contact r drops out. The dropout time is determined by the inherent dropout response of the relay, and the relative values of resistors R1 and R2 and capacitor C1. Thus the rate of discharge of capacitor C1 through resistors R1 and R2 in conjunction with the voltages produced at connection points B and D, as determined by the voltage divider consisting of the series connection of resistors R7, R8, R9, and R10, determines when, under the stated conditions, transistor T1 will be driven to nonconduction.

When transistor T1 is in effect evaluating the voltage across capacitor C1, it is always decoupled from the timing control circuit during its conducting and nonconducting states by diodes D2 and D3, respectively. Therefore, the transistor arrangement comprising transistors T1, T2, and T3 does not have any influence on the timing control circuit. Additionally, resistors R5 and R6 preferably have high resistance values, thereby making it possible to provide high resistance values for resistors R1 and R2. If the resistance values of resistors R1 and R2 are thus made very high, the capacitance of capacitor C1 may be minimized while still providing relatively long response and dropout times for relay R.

The graphs shown in FIG. 2 may be used to illustrate operation of the circuit according to FIG. 1.

Graph a shows the control signal applied at various times to input ES of the timing control circuit. Graph b shows the corresponding voltages produced at connection point A. Graph c shows the operating condition of transistor T1 during the corresponding times, and graph d shows the corresponding condition of relay R. The latter graph shows the increase in response and dropout times produced by the timing control circuit according to the invention.

The actual response time of relay R is designated Tan and the actual dropout time provided by the timing control circuit is designated Tab. The ordinary response and dropout times provided by relay R in the absence of the time control circuit shown in FIG. 1 are respectively designated TRan and TRab. Thus, according to the graphs shown, a positive control signal +Ub is applied to input ES of the timing control circuit at time t1. Connection point A, prior to time t1, is at some negative value determined by the relative resistance values of the series connection consisting of resistors R7, R3, R1, and R2. However, when switch S is actuated to the broken line position to thereby apply the positive power supply +Ub to input ES of the timing control circuit, capacitor C1 starts to charge according to the above-described manner. Thus, the potential at connection point A begins to increase positively, according to the time constant of the charging circuit comprising resistor R1 and capacitor C1. If the control signal +Ub is removed prior to the time that connection point A reaches predetermined potential Ua, transistor T1 is not biased to the conducting state and consequently relay R is not energized. This example is shown in FIG. 2 as example a, existing between times t1 and t2.

However, if control signal +Ub is applied to input ES of the timing control circuit for a period of time b between times t3 and t6, it is seen that the voltage at connection point A exceeds predetermined potential Ua. When this condition occurs, transistor T1 is biased to conduction. Thus, at time t4 the potential at connection point A reaches predetermined potential Ua, and consequently as shown in graph c, transistor T1 is driven to the conducting state.

Graph d shows that the response time of relay R is effectively increased by time X by the timing control circuit. Thus, it is not possible for relay response to be initiated until the potential at connection point A reaches predetermined potential Ua. This requires additional time X. After the potential at connection point A reaches the predetermined potential Ua, current flows through the relay and its inherent response TRan is then added on to provide a total actual response time of Tan for the relay after initial application of control signal +Ub to input ES of the timing control circuit.

The positive control signal +Ub is removed from input ES of the timing control circuit at time t6. Therefore, capacitor C1 begins to discharge and the potential at connection point A decreases according to the time constant of the discharge circuit described above. If it is assumed that at time t7 a positive control signal +Ub is reapplied to input ES of the timing control circuit, and that the time elapsing between times t6 and t7 is less than the dropout time tab of relay R, relay R will not drop out. This is because transistor T1, T2, and T3 are not driven to nonconduction since the potential at common connection point A does not decrease to a level below predetermined potential Ua during the time elapsing between times t6 and t7. The above described operating states are illustrated by cases c and d shown in the graphs.

At time t8 a positive control signal +Ub is applied to the timing control circuit, having a time duration which is less than the time period required for recharging capacitor C1. The actual dropout time of relay R is thereby decreased, since capacitor C1 does not have to be recharged to predetermined potential Ua. If the short positive control signal is terminated at time t9, discharge of capacitor C1 produces predetermined potential Ua at time t10. Consequently transistor T1 is again biased to nonconduction, and at time t11 the relay drops out. The reduced dropout time is designated Trab.

During time period f, capacitor C1 is completely discharged, and at time t12 the positive control signal +Ub is again applied to input ES of the timing control circuit. Consequently capacitor C1 begins to charge and at time t13 connection point A is at predetermined potential +Ua, thereby driving transistor t1 to the conducting state. Then, after time TRan, which is the inherent response time of the relay, relay R responds. If at time t14 the positive control signal is again removed, capacitor C1 begins to discharge and at time t15 the potential at connection point A decreases to predetermined position Ua. Transistor t1 is thereby driven to the nonconducting state and, after time TRab which is the inherent dropout time of the relay, relay R drops out. Thereby a total actual defined dropout time $T_{ab}$ results.

The examples shown during time periods $d$ and $e$ may be used to illustrate how a shortened total dropout time may occur. To prevent this, the relative values of the timing control circuit components must be relatively selected.

Figure 3:
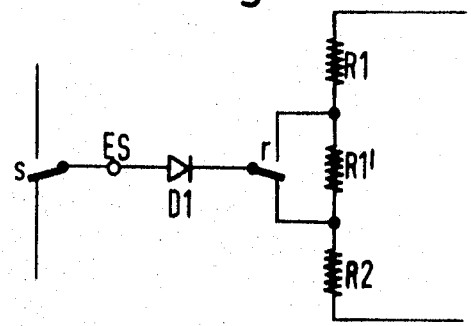
FIG. 3 is an electrical schematic diagram of a preferred arrangement of the input circuit of the invention for use in conjunction with a particular telegraphy system.

The arrangement shown in FIG. 3 is particularly advantageous for use with the timing control circuit when it is thereby employed in telegraphy installations. Thus contact $r$ is connected to the cathode of diode D1. Depending upon its position, it connects the cathode of diode D1 to a particular end of resistor R1'. Resistor R1, R1', and R2 are connected in series, with resistors R1 and R2 corresponding to the similarly designated resistors in FIG. 1. The remaining portion of the timing control circuit shown in FIG. 1 is not shown in FIG. 3 in order to simplify the drawings.

Capacitor C1 is always charged over resistors R1 and R1' when relay R is unactuated, and only over resistor R1 when relay R is actuated. If the circuit is to be used to supervise telegraphy signals (line supervision) where a telegraphy speed of 50 Bd is employed, pulses of time variation at least equal to 20 ms. are used. Therefore, the resistance of resistor R1 is selected such that when the relay is actuated, a time period of 19 ms. is sufficient to recharge capacitor C1. Various modifications of the invention may be made. For example, the collector circuit of transistor T3 may be used to selectively energize a plurality of relays. These may be connected in parallel. Furthermore, diode D1 may be eliminated if a single-current control is used. Other type conductivity transistors may be used, providing appropriate changes in the biasing thereof is made.

I claim:

1. A time control system having an RC circuit and a transistor having a base, emitter and collector for use with a relay having associated contacts comprising:

A source of potential having first ($+Ub$) and second ($-Ub$) output terminals;

a first voltage divider comprising the series connection of first (R3) resistance means, a first diode (D2) and second (R1) and third (R2) resistance means connected between the first ($+Ub$) and the second ($-Ub$) output terminals;

capacitance means (C1) connected between the series connection of first diode (D2) and the second (R1) resistance means and a point of reference potential (MTB);

an oppositely poled second diode (D3) connected between the common connection of the first (R3) resistance means and the first (D2) diode and the base of the transistor, the collector and emitter being connected to opposite terminals of the source of potential ($\pm Ub$);

input means (S) to selectively connect one of the first ($+Ub$) and second ($-Ub$) output terminals to the series connection of the second (R1) and third (R2) resistance means to charge the capacitance means (C1) through the second resistance (R1) means, or to discharge the capacitance means through the series connection of the second (R1) and third (R2) resistance means to selectively bias the base of the transistor with respect to its emitter; and the relay being connected in the collector output circuit and being energized when the transistor conducts.

2. The time control system recited in claim 1 further comprising a second voltage divider connected between the first ($+Ub$) and second ($-Ub$) output terminals, the emitter being connected to said second voltage divider, the first and second voltage dividers being relatively selected such that when the series connection point of the first diode (D2) and second resistance means (R1) of the first voltage divider reaches a predetermined potential ($Ua$), the second diode (D3) and the transistor (T1) are biased to conduction and the first diode (D2) is biased to nonconduction; the second diode (D3) and transistor (T1) being biased to nonconduction and the first diode (D2) being biased to conduction when the predetermined potential ($Ua$) is not reached at said series connection point (A).

3. The time control system recited in claim 1 wherein fourth (R1') resistance means are connected between the second (R1) and third (R2) resistance means, the input means being selectively connectable to opposite ends of the fourth (R1') resistance means through a movable relay contact ($r$), the relay contact ($r$) connecting the input means to the series connection of the second (R1) and fourth (R1') resistance means when the relay is energized, and to the series connection of the third (R2) and fourth (R1') resistance means when the relay is not energized.

4. The time control system recited in claim 1 further comprising means including additional transistors connected to the output of the first transistor to therewith comprise a plurality of amplifier stages, the relay being connected in the output circuit of the last amplifier stage.

5. The time control system recited in claim 3 further comprising means including additional transistors connected to the output of the first transistor to therewith comprise a plurality of amplifier stages, the relay being connected in the output circuit of the last amplifier stage.

6. The time control system recited in claim 1 wherein a plurality of relays are connected in the collector output circuit.

7. The time control system recited in claim 5 wherein a plurality of relays are connected in the output circuit of the last amplifier stage.

8. The time control system recited in claim 2 wherein fourth (R1') resistance means are connected between the second (R1) and third (R2) resistance means, the input means being selectively connectable to opposite ends of the fourth (R1') resistance means through a movable relay contact ($r$), the relay contact ($r$) connecting the input means to the series connection of the second (R1) and fourth (R1') resistance means when the relay is energized, and to the series connection of the third (R2) and fourth (R1') resistance means when the relay is not energized.